United States Patent [19]

Bonato

[11] 4,247,738
[45] Jan. 27, 1981

[54] FLUSH-MOUNTING ELECTRICAL BOX ASSEMBLY HAVING SWITCH AND SOCKET HOLDER FRAME FOR ELECTRICAL BUILDING INSTALLATIONS

[76] Inventor: Marcellino Bonato, 37060 Castel D'Assano, Milan, Italy

[21] Appl. No.: 923,867

[22] Filed: Jul. 12, 1978

[51] Int. Cl.³ .............................................. H02G 3/08
[52] U.S. Cl. ........................................ 174/53; 174/58; 220/3.4; 220/3.8; 220/3.9
[58] Field of Search ................. 174/48, 53, 58, 66, 174/65 R; 220/3.8, 3.3, 3.4, 3.2, 3.9, 241, 242, 3.92, 3.94

[56] References Cited

U.S. PATENT DOCUMENTS

| | | | |
|---|---|---|---|
| 1,016,925 | 2/1912 | Appleton | 220/3.94 |
| 1,724,307 | 8/1929 | Peterson | 220/3.4 |
| 2,178,168 | 10/1939 | Gibson | 220/3.9 X |
| 2,314,408 | 3/1943 | Knight | 174/58 X |
| 2,422,553 | 6/1947 | Johansson et al. | 220/3.8 X |
| 2,506,207 | 5/1950 | Geist | 220/3.4 |
| 2,667,368 | 1/1954 | Ferguson | 174/65 R X |
| 2,983,399 | 5/1961 | Slater et al. | 220/3.8 X |
| 3,015,408 | 1/1962 | Campbell et al. | 220/3.8 X |
| 3,029,964 | 4/1962 | Hudson et al. | 22/3.8 X |
| 3,101,097 | 8/1963 | Murray | 220/3.4 X |
| 3,187,084 | 6/1965 | Stillman et al. | 174/53 X |
| 3,288,910 | 11/1966 | Zerwes | 174/53 |
| 3,343,704 | 9/1967 | Terry | 220/3.8 X |
| 3,392,228 | 7/1968 | Zerwes | 220/3.8 X |
| 3,409,637 | 1/1970 | Pope | 220/3.8 X |
| 3,563,482 | 2/1971 | Auld | 220/4 B |
| 3,606,065 | 9/1971 | Carlson | 220/4 B |
| 3,734,342 | 5/1973 | Patterson | 220/3.94 |
| 3,964,705 | 6/1976 | Giovanni | 174/93 X |

Primary Examiner—Allan N. Shoap
Attorney, Agent, or Firm—Neil F. Markva

[57] ABSTRACT

A flush-mounting electrical box assembly has preassembled electrical control elements contained therein. The box assembly may be flush mounted in unfinished walls to protect the electrical control elements during wall finishing works. The assembly comprises a box, a frame and an outer protective cover. The box has an open side and one or more removable zones or portions to provide openings for the passage of the cable ends or terminals of the electrical system or installation and relative flexible protecting tubes. The frame accommodates and secures at at least one electrical control element (such as a switch, socket or the like) and elements for securing the frame to the edge surrounding the open side of the box. The frame is of an outer size and shape to be completely received in the box with at least one electrical control element applied and connected to the system or installation terminals. The outer protection cover or lid is removably mounted to the open side of the box. Supporting elements support the frame on the edge surrounding the open side of the box.

25 Claims, 9 Drawing Figures

FLUSH-MOUNTING ELECTRICAL BOX ASSEMBLY HAVING SWITCH AND SOCKET HOLDER FRAME FOR ELECTRICAL BUILDING INSTALLATIONS

FIELD OF THE INVENTION

This invention relates to electrical installations for illumination and motive or driving power for buildings intended for use as dwellings or houses, offices, hospitals, schools, etc., both erected by conventional systems and prefabrication systems.

BACKGROUND OF THE INVENTION

At present, electrical installations are set up by breaking through finished masonry with cable ends or terminals being left free until plastering and painting operations have been carried out. The various electrical control elements such as sockets, switches and the like then can be located in the masonry or building structure. This procedure is dangerous and suffers from disadvantages due to the possibility of causing damages to the ends of terminals and is time consuming and the like.

SUMMARY OF THE INVENTION

In order to overcome such disadvantages, this invention is directed to an electrical box assembly or flush-mounting device adapted to accommodate the cable ends and sockets, pushbuttons or control switches previously linked or connected thereto. Thus, the box assembly with the contained electrical control elements can be readily and safely positioned in a masonry wall already formed or being formed, while being protected against any damage which may be caused thereto by further operations (such as plastering, painting and so on).

Particularly, it is the object of the present invention to provide a box assembly or flush-mounting device comprising a protective box for the cable ends, a switch or socket holder frame, and a box lid or cover. This device is particularly suitable for use with said preformed installations, but is usable also in other cases.

Particularly, it is the object of the present invention to provide a device for use to accommodate and position the cable ends of an electrical installation. The device includes a box, an outer protective cover and a frame. The box has one open side and at least one portion set for being drilled through at a position other than that of said open side for cable passage. The frame is temporarily received in the box and accommodates at least one electrical control element such as a switch or socket or the like. The outer protection lid or cover is removably disposed on the open side of the box while the frame is in temporary position in the box. In one embodiment, the frame comprises tabs movable between a collapsed or folded position and an extended position. When the tabs are in the folded position, the frame can be introduced into the box at the temporary position. When the tabs are in an extended position, the frame bears against the box edge without entering the box.

According to another embodiment, the frame is fixed to its final or ultimate position on the box edge by separate supporting means. The device of this embodiment includes the basic combination comprising a switch and socket holder frame for temporary reception in the box, and an outer protection lid or cover. The device of this embodiment is particularly suitable for prefabricated building and additionally comprises an inner cover or lid for the protection of use means or electrical control elements, frame and cable ends, and an element for locating and attaching the box to a wall form or mold. The inner cover or lid and the locating and attaching element includes means for firm engagement to one another and to the box.

According to a preferred embodiment, this last mentioned device also comprises a supporting board or strip, and spacer means for arrangement between the box and the board or strip.

The device of this invention is particularly advantageous because of enabling to connect the cable ends to the electrical controls elements, namely, the switches or sockets when preforming the whole electrical installation relative to a wall, room or apartment or flat. The complete preformed installation can then be applied with its electrical controls elements either to a previously formed wall, before the latter has been plastered and painted, or to a form or mold for a wall casting, which is thus formed with the electrical installation incorporated therein. Following the wall finishing operations (such as plastering and painting), it will be only required to remove the covers or lids from the box assemblies and by an easy and ready operation set up the frames having the previously mounted switches or sockets.

Therefore, a box device according to the present invention allows a wide spread use of preformed electrical installations, thus affording all of the inherent advantages, such as reduction in working times and improved distribution thereof, reduction in labor, more accurate performance, lower waste of material, as well as the possibility of immediately availing a previously checked and perfectly operating electrical installation.

BRIEF DESCRIPTION OF DRAWING

A more detailed description of unrestrictive exemplary embodiments of the device according to the present invention will now be given with reference to the accompanying drawings, in which.

DETAILED DESCRIPTION

Figure 1:
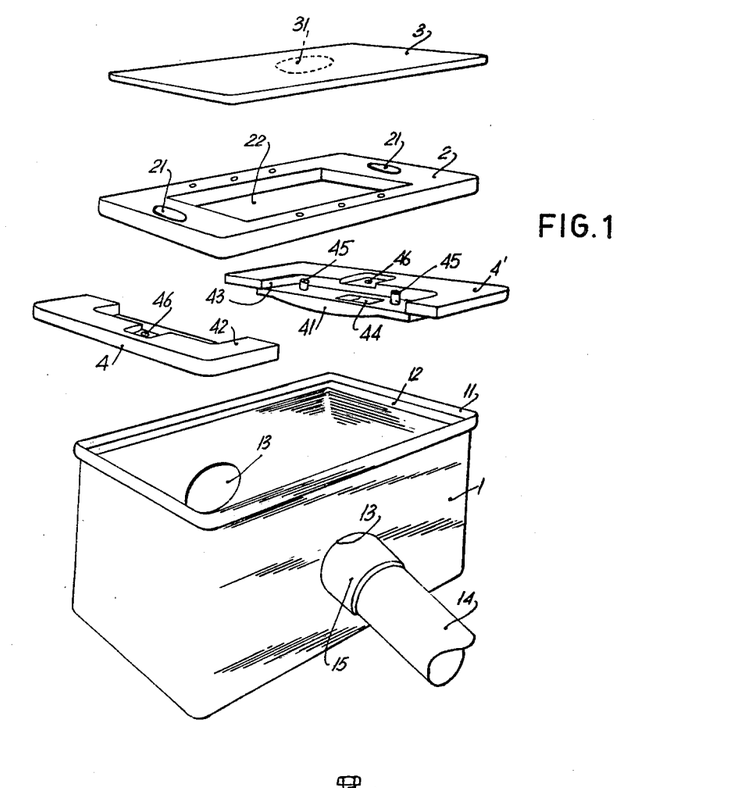
FIG. 1 is an exploded perspective sective view showing the flush-mounting device according to the invention.

According to the present invention, an electrical box assembly or flush-mounting device having a switch and/or socket holder frame, comprises a box-like element or box 1, a frame 2, a cover or lid 3, and separate supports 4 and 4' constituting means for supporting frame 2. Box 1 is of substantially parallelepiped shape (but could be also of different shape) and has an open side, as shown at the top of FIG. 1. An edge 11 projects outwardly and internally forms a shoulder 12 around the open side. As is evident in the drawings and as described herein, the supporting means has a structural configuration to rest on the edge structure of box 1 between box 1 and frame 2. One or more walls of box 1 includes openings 13, or weakening lines for enclosing one or more removable portions to provide one or more openings for the passage of the flexible tubes 14 containing the electrical cables. A sleeve 15 reinforces and fastens the flexible tube 14 to the associated opening 13. Each box 1 is internally formed with projections 16 having a through hole 18 extending therethrough.

Supports 4 and 4' are identical and includes a portion 41 projecting at the bottom for insertion in box 1, and an enlarged top portion 42 for positioning over a length of box edge 11 and projecting therefrom, along one side and portions of two sides of box 1 adjoining said first mentioned side. Each support 4 and 4' includes cavity 43 which is surrounded by top portion 42 and accommodates one end of frame 2. An elongated opening 44 and frame positioning stakes 45 are located in cavity 43 and a hole 46 is drilled in top portion 42.

Figure 3:
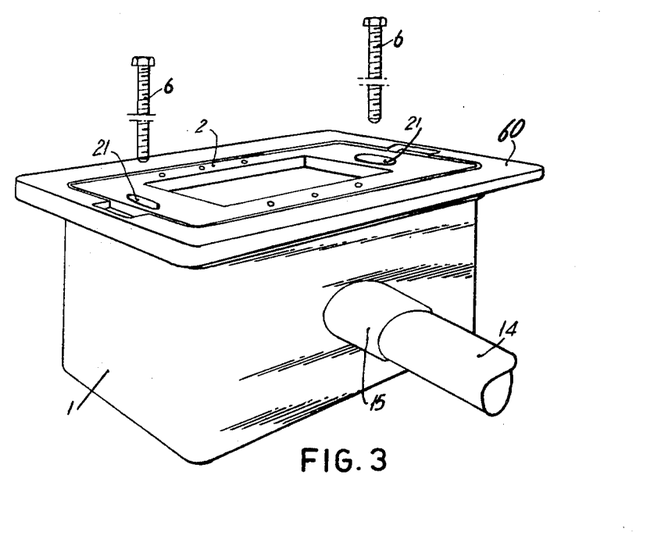
FIG. 3 is a perspective view of the device as mounted to the final or ultimate position, according to a slightly different embodiment than that of FIG. 1.

Alternatively, the two supports 4 and 4' may form a one piece support unit 60, centrally open for accommodating frame 2 in place. A support unit 60 is shown in the example of FIG. 3.

The contour of frame 2 is substantially of rectangular shape with rounded corners and outer size for insertion in box 1. As shown, frame 2 has a unitary construction. Elongated through openings 21 are located at opposite sides of frame 2. The central region 22 may be of any configuration as desired, depending upon the electrical control elements frame 2 is intended to accommodate, e.g., one or more switches, one or more sockets, and depending on the type of switches or sockets that have been provided. At the underside, frame 2 has cavities or bores (not shown) for receiving positioning stakes 45. Such cavities or bores and positioning pins or stakes are optional.

Cover or lid 3 comprises a plate elements of such external sizes to be accommodated and retained within box edge 11. Preferably, lid 3 has a portion 31 surrounded by a weakening line, so that it can be easily removed for cover or lid extraction, or any other means for facilitating such an extraction.

Figure 2:
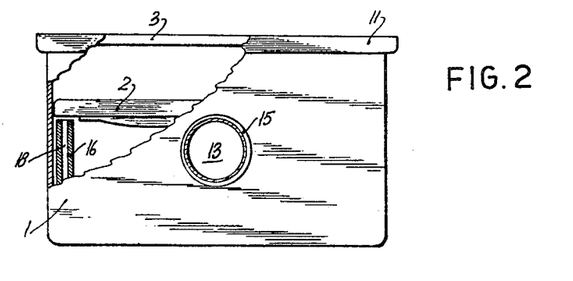
FIG. 2 is a side elevational view, wherein a portion has been removed for showing a sectional view, of the device shown in FIG. 1, at the temporary position.

The box assembly or flush-mounting device is shown in FIG. 2 at its temporary position. Box 1, as closed by cover or lid 3, contains frame 2 resting on projections 16. The wire or cable ends enter box 1 through openings 13 and connect to the use means or electrical control elements (i.e., switches, sockets, pushbuttons and the like).

In FIG. 3 a box assembly or flush-mounting device has a single support 60 in the final mounting form. Cover or lid 3 has been removed. This single support 60 (or supports 4 and 4') bears on the box edge 11 and cavity or bore 43 thereon accommodates frame 2. Screws 6 each pass through an opening 21 of frame 2, an opening 44 of support 60 and are secured within hole 18 of projection 16. The device so assembled is then ready for being completed with any type of conventional covering plate which is secured to support holes 44 by means of screws.

Figure 4:
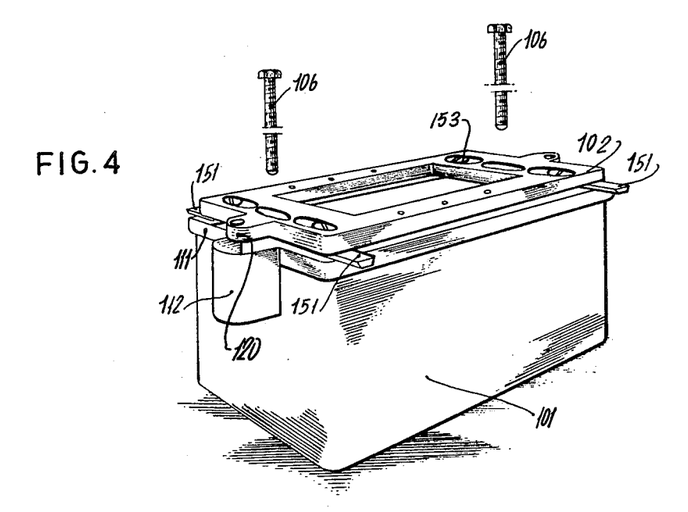
FIG. 4 is a perspective view of another embodiment of the device shown in an assembled condition or installed position.

In the embodiment shown in FIG. 4, the box assembly or flush-mounting device comprises a box-like body or box 101, a frame 102, and a cover or lid (not shown). In this embodiment box 101 is of parallelepiped shape and has its upper side open. An opening (not shown) may be formed in each of the other sides for the passage of electrical wires or cables, as above mentioned in connection with the embodiment of FIGS. 1–3.

Box 101 has an enlarged upper edge 111 forming a shoulder for holding the cover or lid, but it should be understood that the engagement between the cover or lid and box could be of any other type. Moreover, and still referring to this embodiment, box 101 has two opposite lugs 112 disposed at each end thereof to form two inner shoulders, against which projections or tabs 120 of frame 102 are accommodated at the temporary position. Any other bearing means for box frame 102 could be adopted as well. At opposite positions, box 101 also has two inner projections 16 with elongated and threaded or not threaded holes 18, as the box of FIGS. 1–3.

The lid (not shown) is substantially similar to lid or cover 3 of FIG. 1, except for the provision of side tabs, so as to cover the entire open top side of box 101. The outer contour of frame 102 is substantially of quadrangular shape with tabs 120, whereas the interior may be shaped as desired. For this embodiment three bores or cavities 123 accommodate the switches and sockets in a per se known manner.

Figure 5:
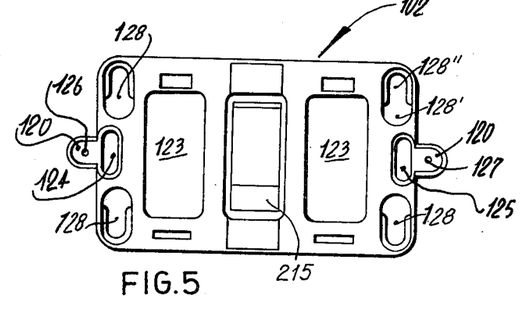
FIG. 5 is a plan view showing a type of means holder frame.
Figure 5A:
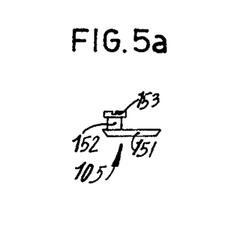
FIG. 5a is a side view showing an element for the frame of FIG. 5.

Frame 102 has on opposite ends thereof elongated through holes 124 and 125 for fastening to the box at final or ultimate position; holes 126 and 127 for attaching the covering plate; and in this embodiment further holes 128 at locations corresponding to the four corners of the frame. Each hole 128 has a widened portion 128' adjoining a narrowed portion 128''. Each of holes 128 receive a tab means 105 (FIG. 5a) comprising a plate 151, a short stem 152 of a diameter not larger than, and about the same as the smallest diameter of hole 128, and a head 153 of a diameter between the minor and major diameters of hole 128. Preferably, head 153 has a notch for turning by a tool, such as a screwdriver. The tab means 105 is inserted in its associated hole 128 from the widest portion thereof and then shifted to the narrowest portion where it remains engaged by stem friction against the walls (or head against the walls). By hand or any other means, each tab 105 can be turned from a retracted position inwardly of frame 102 to an outwardly extended position (as shown in FIG. 4. Of course, other systems are possible and within the scope of the present invention for causing tabs 105 to slide between extended and retracted positions.

The use of the box assembly or flush-mounting device will now be described.

The installation relating to one or more rooms is supplied ready for mounting as completed with power lines, switches and sockets, interphone lines, TV cable, control pushbuttons and all of the fittings as required for completing the installation or system within the flat or apartment. The wall formed but not yet finished or plastered has secured in place thereto the box assemblies of flush-mounting devices at the temporary or closed arrangement thereof shown in FIG. 2, and already provided with the associated electrical system connections, care being taken that the end length is somewhat oversized. They may be cemented in place, and then all of the conventional operations of plastering, painting and the like can be carried out without any damage thereto because of being closed. Upon completion of wall finishing works, the outer protection cover or lid surfacing from the wall is removed. Frame 2 (102) is extracted and positioned on the box edge by supports 4, 4', or support 60, or tabs 105 and secured to the box by means of screws 6 or (106). Thus, the switch or socket is in use position without any further damages to the finished wall.

Figure 6:
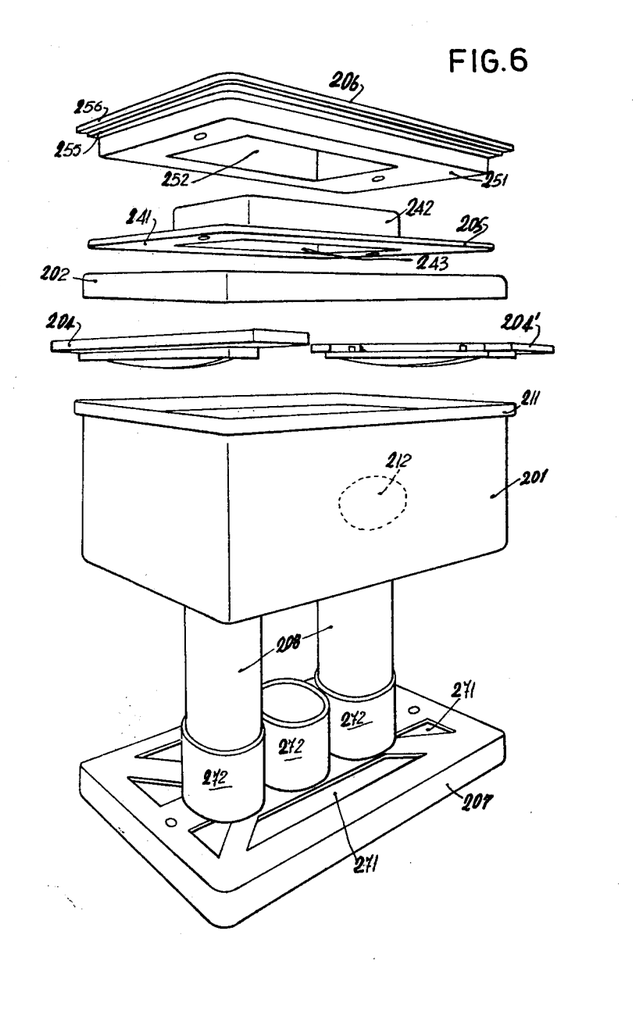
FIG. 6 is a partially exploded perspective view showing a further embodiment of the device.
Figure 7:
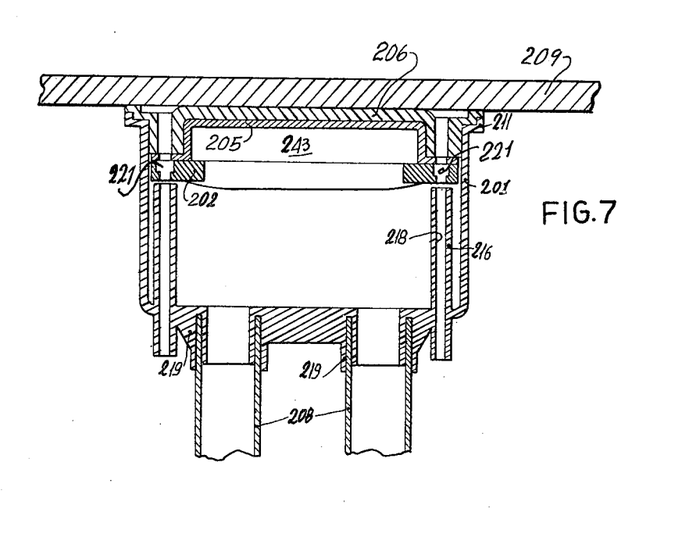
FIG. 7 is a longitudinal sectional view along a device of FIG. 6 at its temporary or closed position.
Figure 8:
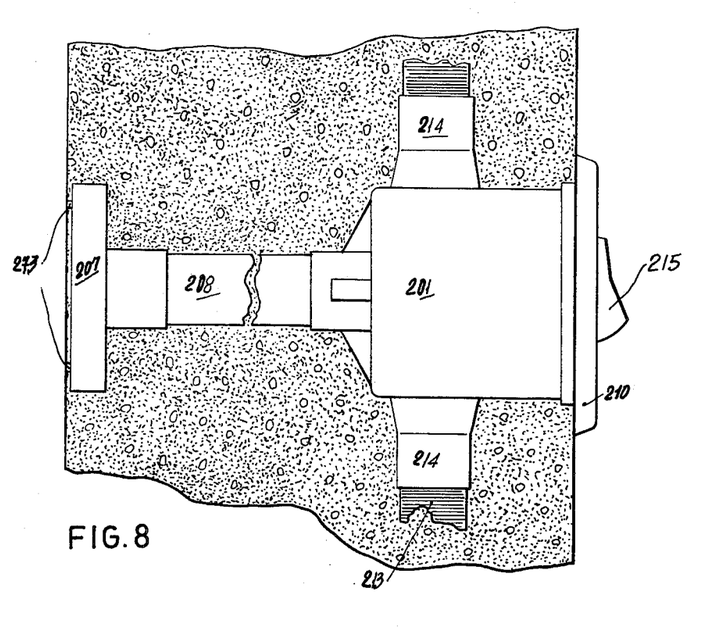
FIG. 8 is a side view of the device, as seen in its final attitude, and embedded in the concrete wall.

The box assembly or flush-mounting device of FIGS. 6 to 8 substantially comprises a box-like element or box 201, a frame 202, supports 204 and 204' for frame 202, an outer plate cover or lid (not shown but identical to cover or lid 3 of FIG. 1), and a positioning and attaching element 206.

As shown, box 201 is substantially of parallelepiped shape (but could be of any other shape) and has an open top side. A projecting edge 211 around this open side internally forms a shoulder for supports 204, 204' and/or a cover or lid to bear thereon. As in the other mentioned embodiments, one or more walls of box 201 may be provided with openings, or weakening lines may be formed therein for surrounding one or more removable portions 212 to provide one or more openings for the passage of flexible tubes containing the electric wires or cables. For example, in FIG. 8, box 201 is shown as completed with a flexible tube 213 and associated connecting sleeve 214, inserted in an opening provided in the box wall. Internally, each box 201 is formed with projections 216 having holes 218 longitudinally passing therethrough.

The construction of frame 202 is the same as that above mentioned for frames 2 and 102, or has such external sizes that it can be accommodated within box 201, and has holes 221 for fastening thereof to box 201 at the final or ultimate position.

Supports 204 and 204' are also described in connection with FIGS. 1 to 3 and may be substituted for by a single support.

The inner protection cover or lid 205 has an outer contour of such shape and size that it can be somewhat forcibly inserted in box 201. Furthermore, lid 205 has a lat strip or flange 241 around its perimeter, and a central portion 242 which is raised on one face and forms on the opposite face a corresponding cavity 243.

The outer protection cover or lid (not shown) is identical to cover or lid 3 described in connection with FIGS. 1 to 3.

The positioning and attaching element 206 has at the bottom a flat zone 251 around the perimeter and a shape and size substantially corresponding to portion 241 of inner cover or lid 205. Centrally, and still on the underside, element 206 has a cavity 252 of such shape and size to be somewhat forcibly slipped or threaded on the raised central portion 242 of inner cover or lid 205. A stepped rim projects along the outer perimeter of element 206. The first step 255 is adapted to be received within box edge 211, while the second step 256 is of shape and size for projecting beyond box edge 211. The shape of the upper face of attaching element 206 is not essential to the purposes of the present invention and therefore will not be described.

According to a preferred embodiment, an assembly or device according to the invention also comprises a supporting board or strip 207 and a spacer element 208, located between board or strip 207 and box 201. Board or strip 207 is of substantially parallelepiped shape (but could obviously be of any other shape), and includes through openings 271 and one or more sleeve projections 272. On the opposite side or face to sleeve projections 272, strip or board 207 preferably has pins or stakes 273, at least slightly projecting beyond the board or strip edge.

Box 201 also has sleeve projections 219 on the opposite side to the open side. In this case, spacer elements 208 comprises a pair of tubular elements of a desired length and selected in relation to the wall thickness. Elements 208 are arranged between box 201 and board or strip 207 with the ends thereof in the respective sleeves 219.

The box assembly of flush-mounting device shown in FIGS. 6 to 8 is particularly advantageous in prefabricated building and a manner of use thereof will now be described.

The electrical installation relating to at least the wall, in which the assembly or device is to be inserted is preformed in laboratory, and the ends or terminals are contained in box 201 connected to the electrical control elements such as switch 215 on frame 202. Then, the ends or terminals connected with the control elements such as switch 215 secured on frame 202 are inserted in box 201, with frame 202 bearing on projections 216. In other words, frame 202 has a configuration effective to accommodate at least one electrical control element such as switch 215 secured thereon and further effective to be disposed in a temporary position inside box 201. The inner lid or cover 205 is pressed to closing position within box 201 until abutting against frame 202. Cavity 243 provides the required space or room for any buttons or sockets of the electrical control elements. The box 201 is then closed by the outer plate cover or lid such as lid 3 shown in FIGS. 1 and 2 and completed with spacers 208 and board or strip 207. At the building yard and/or factory, rivets or magnetic means are used to secure element 206 at the desired position in a conventional type of form or mold 209 used for casting concrete walls. Once the element 206 is secured to mold 209, the outer plate cover or lid 3 is removed from box 201 which is then applied to element 206. Then, box 201 can be completed with the spacers and supporting board or strip 207 according to the type of construction being used, care being taken of applying spacers of a proper size, so that the board or strip 207 is flush with the opposite form or mold (not shown). Concrete can then be cast into the mold or form without any danger or risk of damage for the terminals and electrical control elements in the box. The supporting board or strip and spacers, where provided, cooperate with element 206 to prevent box 201 from being displaced from the initial position or from being overturned during the casting operation. It should be noted that the board or strip 207 contacts the form or mold only at the end surfaces of pins 273, and only pins 273 appear in the wall after removing the form or mold.

When the concrete wall is dismantled, element 206 is removed with the form or mold (and may be reused for various other walls), the inner protection cover or lid 205 is left and the usual outer plate protection cover or lid 3 is applied. After the wall finishing operations, also these lids 3 and 205 are removed, and frame 202 is extracted and mounted through supports 204 and 204' by means of screws and then the covering plate 210 is applied. Thus, the assembly appears as shown in FIG. 8, incorporated in the concrete wall.

It should be noted that box or device 1 may have inner projections for an improved engagement of the covers or lids and positioning and attaching element. The spacer means may be other than that herein described and also the supporting board or strip may be different than that described.

What is claimed is:

1. An electrical box assembly for electrical building installations or systems, said assembly comprising:
   (a) a box having an open side with an edge structure,
   (b) a frame member for accommodating and securing at least one electrical control element thereon,
   (c) said frame member having a configuration effective to be disposed in a temporary position inside said box which is effective to receive said frame member with said electrical control element secured thereon,
   (d) an outer protective cover removably mounted to said open side of the box when said frame member is disposed in said temporary position,
   (e) supporting means for holding said frame member on said edge structure in an installed position.

2. An assembly as defined in claim 1 wherein said supporting means surrounds a portion of the edge structure.

3. An electrical box assembly for electrical building installations or systems, comprising:
   (a) a box having an open side with an edge structure,
   (b) frame means having a configuration effective to accommodate at least one electrical control element to be secured thereon, and having a shape and a size effective to be disposed in a temporary position inside said box,
   (c) an outer protective cover means removably mounted to said open side of the box when said frame means is disposed in said temporary position, and
   (d) supporting means being separate from said box and having a structural configuration to rest on said edge structure between said box and frame means for holding said frame means on said edge structure in an installed position.

4. An assembly as defined in claim 3, wherein said box includes a removable portion to provide an opening for the passage of cable ends for terminals.

5. An assembly as defined in claim 3, wherein said supporting means comprise two separate support portions each of which carries one of two opposite sides of the frame means,
   each support portion includes holes for the connection of a conventional covering plate for the installed assembly.

6. An assembly as defined in claim 3, wherein said outer protection cover has gripping means for aiding in removal.

7. An electrical box assembly for electrical building installations or systems, said assembly comprising:
   (a) a box having an open side and a removable portion on another side of said box to provide an opening for the passage of a cable end and a relative flexible protecting tube,
   (b) a frame for accommodating and fastening at least one electrical control element such as a switch, socket and the like,
   (c) supporting means to carry said frame on the edge surrounding the open side of the box in an installed position,
   (d) said frame is of such outer shape and size to be completely accommodated in said box in a temporary position,
   (e) an outer protection cover or lid removably mounted to said open side of the box, and
   (f) fastening means for fastening said frame with said supporting means on the edge surrounding the open side of the box,
   (g) said supporting means comprise tabs carried by the frame and being movable between a collapsed or folded position and an extended position,
   (h) said frame being disposed in said box at said temporary position when said tabs are in the folded position, and
   (i) said frame with said tabs to bear against the box edge without entering the box when the tabs are in the extended position,
   (j) said frame having holes for the application of a covering plate.

8. An assembly as defined in claim 7, wherein each of said tabs comprise a plate connected by a short stem perpendicular to an enlarged head, and 9. An electrical box assembly for electrical building installations or systems, said assembly comprising:
   (a) a box having an open side and a removable portion on another side of said box to provide an opening for the passage of a cable and a relative flexible protecting tube,
   (b) a frame for accommodating and fastening at least one electrical control element such as a switch, socket and the like,
   (c) supporting means to carry said frame on the edge surrounding the open side of the box in an installed position,
   (d) said frame is of such outer shape and size to be completely accommodated in said box in a temporary position,
   (e) an outer protection cover or lid removably mounted to said open side of the box, and
   (f) fastening means for fastening said frame with said supporting means on the edge surrounding the open side of the box,
   (g) an inner protection cover shaped to fit within said box and to accommodate the electrical control element secured to the frame, and
   (h) the relationship of said inner protection cover with said box being such as to accommodate thereover a positioning and attaching element for connecting to a form to mold a building wall casting.

10. An assembly as defined in claim 9, wherein spacer means disposed on the outside of said box opposite said open side connect a supporting board or strip to said box,
    said spacer means having a length selected in connection with the width of the wall being formed by casting moldable material into a mold to produce a building wall casting.

11. An assembly as defined in claim 10, wherein said spacer means comprise tubes inserted in projecting sleeves disposed on said box and further projecting sleeves disposed on said board or strip.

12. An assembly as defined in claim 10, wherein said board or strip includes outwardly projecting rest or bearing pins located to contact the mold and thereby provide a narrow bearing surface.

13. An assembly as defined in claim 9, wherein said positioning and attaching element includes holes for fastening to said mold form.

14. An assembly as defined in claim 9 wherein said positioning and attaching element is effective to connect the assembly to a mold form for casting a building wall.

15. An assembly as defined in claim 9 wherein said inner and outer covers and said attaching element are effective to firmly removably engage an inner wall of the box.

16. An electrical box assembly for electrical building installations or systems, said assembly comprising:
   (a) a box having an open side with an edge structure,
   (b) frame means having a configuration effective to accommodate at least one electrical control element to be secured thereon, and effective to be disposed in a temporary position inside said box,
   (c) an outer protective cover means removably mounted to said open side of the box when said frame means is disposed in said temporary position,
   (d) supporting means for holding said frame means on said edge structure in an installed position,
   (e) said supporting means comprise a single support member of such dimensions as to bear on the box edge and having a central opening to accommodate and support said frame means,
   (f) said support member having holes for the connection of a conventional covering plate for the installed assembly.

17. An electrical box assembly for electrical building installations or systems, said assembly comprising:
   (a) a box having an open side with an edge structure,
   (b) frame means having a configuration effective to accommodate at least one electrical control element to be secured thereon, and effective to be disposed in a temporary position inside said box,
   (c) an outer protective cover means removably mounted to said open side of the box when said frame means is disposed in said temporary position,
   (d) supporting means for holding said frame means on said edge structure in an installed position,
   (e) said supporting means comprise tabs carried by the frame means and being movable between a collapsed or folded position and an extended position,
   (f) said frame means being disposed in said box in a temporary position, when said tabs are in the folded position, and
   (g) said frame means with said tabs to bear against the box edge without entering the box when the tabs are in the extended position,
   (h) said box and said frame means carrying means for securing said frame means with the extended tabs to said box, and
   (i) said frame means having holes for the application of a covering plate.

18. An assembly as defined in claim 17, wherein each of said tabs comprise a plate connected by a short stem perpendicular to an enlarged head, and holes being provided on each frame having a wide portion for the passage of said head and a narrower portion for allowing the passage of only said stem, clamping the head.

19. An electrical box assembly for electrical building installations or systems, said assembly comprising:
   (a) a box having an open side with an edge structure,
   (b) frame means having a configuration effective to accommodate at least one electrical control element to be secured thereon, and effective to be disposed in a temporary position inside said box,
   (c) an outer protective cover means removably mounted to said open side of the box when said frame means is disposed in said temporary position, and
   (d) supporting means for holding said frame means on said edge structure in an installed position,
   (e) said supporting means comprise two separate support portions each of which carries one of two opposite sides of the frame means,
   (f) each support portion includes holes for the connection of a conventional covering plate for the installed assembly,
   (g) said box is of substantially rectangular shape with rounded corners as seen in plan view and has an edge projecting about the open side,
   (h) said support portions are shaped for insertion and location within said projecting edge and a section for bearing on said edge and outwardly projecting therefrom,
   (i) at the opposite side to the box such support portions have notches for receiving and positioning two opposite sections of the frame means,
   (j) said supporting means having positioning pins engaging in suitable cavities in the opposite side of the frame means.

20. An electrical box assembly for electrical building installations or systems, said assembly comprising:
   (a) a box having an open side with an edge structure,
   (b) frame means having a configuration effective to accommodate at least one electrical control element to be secured thereon, and effective to be disposed in a temporary position inside said box,
   (c) an outer protective cover means removably mounted to said open side of the box when said frame means is disposed in said temporary position,
   (d) supporting means for holding said frame means on said edge structure in an installed position,
   (e) an inner protection cover disposed over said frame means when said frame means is disposed in said temporary position, and
   (f) a positioning and attaching element effective to connect the assembly to a form to mold a building wall casting around the assembly,
   (g) said inner and outer covers and said attaching element being effective to firmly removably engage an inner wall of the box.

21. An assembly as defined in claim 20, wherein spacer means disposed on the outside of said box opposite said open side connect a supporting board or strip to said box,
   said spacer means having a length selected in connection with the width of the wall being formed by casting moldable material into a mold to produce a building wall casting.

22. An assembly as defined in claim 21, wherein said board or strip includes outwardly projecting rest or bearing pins located at the end of the spacer means to contact the mold and thereby provide a narrow bearing surface.

23. An assembly as defined in claim 21, wherein said spacer means comprise tubes inserted in projecting sleeves disposed on said box and further projecting sleeves disposed on said board or strip.

24. An assembly as defined in claim 20, wherein said positioning and attaching element includes holes for fastening to said mold form.

25. An electrical box assembly for electrical building installations or systems, said assembly comprising:

(a) a box having an open side with an edge structure,
(b) a unitary frame member having a configuration effective to accommodate at least one electrical control element to be secured thereon, and effective to be disposed in a temporary position inside said box,
(c) an outer protective cover means removably mounted to said open side of the box when said frame member is disposed in said temporary position, and
(d) supporting means for holding said frame member on said edge structure in an installed position.

* * * * *